July 23, 1968  F. G. FINN  3,393,715
WIRE-WRAPPING TOOLS
Filed Jan. 10, 1966
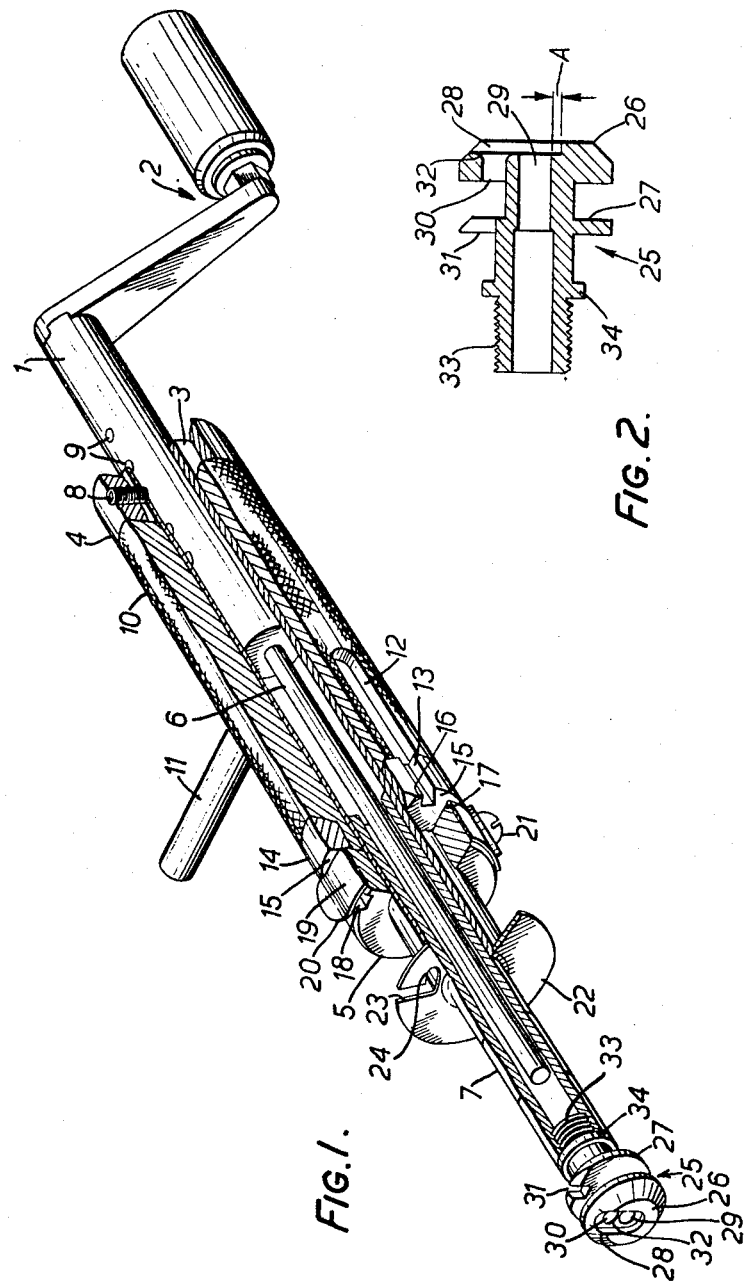
Frederick G. Finn,
INVENTOR,
BY Hall + Wright
ATTORNEY

United States Patent Office 3,393,715
Patented July 23, 1968

3,393,715
WIRE-WRAPPING TOOLS
Frederick G. Finn, Seal, Sevenoaks, Kent, England, assignor to Her Majesty's Postmaster General, London, England
Filed Jan. 10, 1966, Ser. No. 519,568
Claims priority, application Great Britain, Jan. 12, 1965, 1,697/64
10 Claims. (Cl. 140—124)

ABSTRACT OF THE DISCLOSURE

A tool for making wrapped joints has a wire cutter and a wire wrapping and insulation stripping head detachably secured to a stem into which projects a driving shaft. The extent of projection of the shaft into the stem is variable to change the position of the joint. The distance between the head and the cutter is variable to change the length of wire to be wrapped. Preferred forms include components of this combination particularly adapted to cooperate in the combination.

---

This invention relates to wire wrapping tools, that is to say, to tools for making electrical connections by means of the so-called wrapped joint.

It is an object of the present invention to provide a wire wrapping tool of improved construction capable of manufacture in a form giving greater adjustability than has been possible hitherto.

According to the present invention, a wire wrapping tool comprises a driving member, a wire wrapping and insulation stripping head operatively connected with the member and having a longitudinal hole for receiving one or both of two components to be secured together by means of a wrapped joint and a wire feed aperture adjacent the longitudinal hole, a grip for holding the tool, the grip being mounted upon the member for rotation relatively thereto about the axis of the member, and a wire shearing mechanism comprising one component fixed to the member and a second component fixed to the grip, the mechanism being operable by the relative rotation of member and grip.

Preferably, the wire wrapping and insulation stripping head is detachably connected with the member which may be in the form of a shaft, and in one embodiment of the invention, the head is detachably secured to a stem itself secured to the shaft in such manner that the axial distance between the head and the wire shearing mechanism is variable in order to vary the length of wire to be wrapped. The operative end face of the head may have a radial groove into which both hole and aperture open and whose walls effect wrapping.

The stem may have a longitudinal bore communicating at one end with the longitudinal hole in the head and into which the shaft also extends. If now the shaft is capable of longitudinal movement relative to the stem, the extent to which the one component can be inserted into the hole can be varied.

The head may be of a construction in which insulation stripping is effected by means of a slot cut either radially or tangentially in a disc located behind and separate from that part of the head in which the hole and wire feed apertures are formed.

In a particular embodiment of the invention, the shaft is mounted in a sleeve in a manner permitting the shaft to be adjusted longitudinally with respect of the sleeve and to be releasably secured to the latter in a selected position. The stem mentioned above is then also mounted in a releasable manner in the sleeve and is capable of longitudinal and rotational adjustment relatively to the latter. The tubular hand-grip may be rotatably mounted on the sleeve.

The shearing mechanism may have one component secured to the sleeve, this component consisting of an annular collar whose outer curved surface has a longitudinal groove and a displaceable shield over the groove, and the other component, also of annular form, secured to or forming part of the hand-grip, this second component having one end face in close proximity to an end face of the collar, the distance between the two end faces being kept at a minimum. That one end face of the second component has an edge which is bevelled circumferentially except over one part which forms a wire shearing surface. A longitudinal groove may be formed in the outer curved surface of the other component in a position such that the shearing surface forms a boundary at one end of the groove.

By way of example only, an embodiment of the invention will now be described in greater detail with reference to the accompanying drawings of which FIG. 1 shows the embodiment in perspective, parts have been cut away to reveal internal components, and FIG. 2 which is an axial cross-section of the wrapping head of the embodiment.

The wire wrapping tool has a main driving shaft 1 which, in this embodiment, carries, at one end, a manually operable handle 2. The shaft 1 extends into a central tubular sleeve 3 to which collars 4 and 5 are fixed as by brazing, for example. The shaft 1 has an extension 6 of reduced diameter which projects from the sleeve 3 into a stem 7, details of which will be given later. The shaft 1 is axially movable within the sleeve and is secured to the latter for driving purposes by means of a grub screw 8 which is secured through collar 4 into a selected one of several recesses 9 on the surface of the shaft.

Rotatably mounted on the sleeve 3 between the collars 4 and 5 is a tubular hand-grip 10 the major portion of whose external surface is knurled as indicated in the drawing. Extending radially from the hand-grip 10 about midway of its length is a short rod 11 whose function is described later. The external surface of the grip 10 also has a longitudinal recess 12 formed in it and which, at one end of the groove, leads into a shallow groove 13 cut longitudinally in an end part 14 of the grip whose surface is plain. The end part 14 forms one component of a wire shearing mechanism and has an end face 15 which is bevelled circumferentially except for a portion 16 adjoining one side of the groove 13, the end face of the portion 16 abutting closely the end face 17 of the collar 5 which forms the other component of the wire shearing mechanism such that the end play between the two end faces is kept to a minimum, the collar 5 having a shallow longitudinal groove 18 cut in its externally curved surface. The groove 18 is shielded by a leaf spring 19 curved to follow closely the curved surface contour of the collar 5 except at one end 20 of the spring which is curved outwardly away from the collar 5. The spring 19 is fixed to the collar 5 by means of a screw 21.

As can be seen from the drawing, the sleeve 3 projects beyond collar 5 and to the projecting end is secured a guide disc 22 in which is cut a slot having a radial portion 23 and a tangential portion 24, the end of which is aligned with groove 18.

The stem 7 referred to above is slidably and rotatably mounted in the sleeve 3 and can be locked in a given position by means of a grub screw screwed through collar 5. That grub screw is not shown in the drawing but it corresponds with grub screw 8. Screwed into the outer end of stem 7 is a wrapping and insulation stripping head 25 comprising a wire wrapping member 26 and an insulation stripper disc 27. The member 26 is of frusto-conical form with a radial recess 28 cut in its smaller end face, and an axial hole 29 which communicates with the interior of stem 7. Adjacent the hole 29 but spaced radially therefrom is a wire guide hole 30 aligned with a stripper slot 31 in the insulation stripper disc 27. The outer end of the hole 30 is rounded as indicated at 32. The head 25 has a threaded boss 33 which is screwed into the stem 7 until a shoulder 34 on the head abuts the end wall of the stem.

When the tool is to be used to wrap a wire round a terminal tag, the wire is first passed through guide hole 30, and with the end of the tool just engaging the end of the tag, the wire is drawn taut and entered into the portion 24 of the slotted guide disc 22 and passed under spring 19 into groove 18. The wire is then pressed into the stripper slot 31 thereby cutting the insulation on the wire preparatory to stripping. The tool is then pushed on to the tag until the outer end of the tag abuts against the end of the extension 6 of shaft 1. The free end of the wire overlays the bevelled end surface 15 so that when handle 2 is rotated in a clockwise direction with the handgrip held still with the help of the short rod 11, the wire is carried round in the groove 18 and is sheared by the edge of the portion 16 as the groove 18 passes it. Rotation of the handle is continued in the same direction to strip the insulation and wrap the bare wire round the tag in the now well-known manner. A very short length of insulated wire is wrapped round the tag before the wrapping of the bare wire commences, this has the advantage of reducing the chance of the wire fracturing at the point where it first contacts an edge of the tag.

The height on the tag at which wrapping takes place is determined by the extent to which the tag projects into the head 25 and stem 7 and this can be regulated by setting the position of shaft 1 in sleeve 3 by means of grub screw 8 because the extent of projection can be controlled by the distance between the head 25 and the end of the extension 6 of the shaft 1.

It is usualy required to make six turns of bare wire round the tag but the length of wire needed clearly depends upon the wire gauge and the tag dimensions. Since the stem 7 is adjustably mounted in the sleeve 3, the length of wire remaining after operation of the shearing device between the latter and the head 25 and which is the length to be wrapped is determined by the extent to which stem 7 is pushed into sleeve 3. The stem 7 may also be rotated in sleeve 3 to align slot 31 with groove 18 and the stem is then locked in position as already described.

Various combinations of wire gauge and tag size can be dealt with by providing heads 25 having different sizes of holes 29 and 30, recess 28 and stripper slot 31. The diameter of the hole 29 is such as to provide just sufficient clearance to permit easy rotation of the head, for example a diameter of $(d+0.01)$ inch is sufficient for rectangular transverse cross-section tags having a cross-section diagonal whose length is $d$ inches. The diameter of the hole 30 must permit free passage of the insulated wire and a diameter of about 1.5 times the outside diameter of the insulated wire is usually sufficient. To reduce the risk of wire breakage during wrapping, the rounding 32 of hole 30 is of the largest radius possible without breaking into the hole 29. The width of the stripper slot 31 is sufficient to strip the insulation from the wire without damaging the latter and a width of $(w+0.004)$ inch is sufficient for wire the diameter of whose bare conductor is $w$ inches. The width dimension of the slot 28 must be sufficient to ensure effective wrapping of the wire round the tag and a dimension of $(d+2w+0.02)$ inch is usually sufficient. In the radial direction, slot 28 extends for a short distance beyond the hole 29 so as to accommodate the wire during wrapping. The dimension A in the accompanying drawing exceeds the diameter of the bare wire by about 0.005 inch.

The frusto-conical form of the member 26 facilitates the wrapping of wire at the root of angled tags, but it will be apparent that if this facility is not required, a cylindrical form can be used for the member 26.

Further, the tool can be fitted with a power drive by removing the handle 2 and connecting the shaft 1 to a driving motor or to a flexible drive from a remote motor. If a flexible drive is used, the outer casing of the drive may conveniently carry a forked extension which engages the rod 11 to hold the grip 10 stationary. The power drive will of course include a suitable stop-start control.

The tool may also be used to secure a terminal tag to a conductor or to another terminal tag by means of a secondary wrapped joint by inserting both components into the longitudinal hole of the tool and securing them together by means of a separate length of wrapping wire.

I claim:

1. A device for making electrical connections by means of wrapped joints comprising a driving member, a wire wrapping and insulation stripping head operatively connected with the member and having a longitudinal hole for receiving a component to be wrapped or both of two components to be secured together by means of a wrapped joint and a wire feed aperture adjacent the longitudinal hole, a grip for holding the tool, the grip being mounted upon the member for rotation relatively thereto about the axis of the member, and a wire shearing mechanism comprising one component fixed to the member and a second component fixed to the grip, the mechanism being operable by the relative rotation of member and grip, the wire wrapping and insulation stripping head being detachably secured to a stem, itself secured to the member in such a manner that the axial distance between the head and the wire shearing mechanism is variable in order to vary the length of wire to be wrapped.

2. A device as claimed in claim 1 in which the operative end face of the head has a radial groove into which both said hole and said aperture open and whose walls effect wrapping.

3. A device as claimed in claim 1 in which the member is in the form of a shaft and in which the stem has a longitudinal bore communicating at one end with the longitudinal hole in the head and into which the shaft also extends.

4. A device as claimed in claim 1 in which the head includes an insulation stripping device in the form of a slotted disc located behind and separate from that part of the head in which the hole and wire feed apertures are formed.

5. A device as claimed in claim 1 in which the member is a shaft which is mounted in a sleeve in a manner permitting the shaft to be adjusted longitudinally with respect to the sleeve and to be releasably secured to the latter in a selected position.

6. A device as claimed in claim 5 in which the stem is also mounted in a releasable manner in the sleeve and is capable of longitudinal and rotational adjustment relatively to the latter.

7. A device as claimed in claim 5 in which the grip is in the form of a tube rotatably mounted on the sleeve.

8. A device as claimed in claim 5 in which the shearing mechanism has one component secured to the sleeve, this component consisting of an annular collar whose outer curved surface has a longitudinal groove and a displaceable shield over the groove, and the other component, also of annular form, secured to or forming part of the hand-grip, this second component having one end face in close proximity to an end face of the collar, the distance between the two end faces being kept to a minimum.

9. A device as claimed in claim 8 in which the one end face has an edge which is bevelled circumferentially except over one part which forms a wire shearing surface.

10. A device as claimed in claim 9 in which a longitudinal groove is formed in the outer curved surface of the second component in a position such that the shearing surface forms a boundary at one end of the groove.

References Cited

UNITED STATES PATENTS 2,807,810 10/1957 Belek et al. _____ 140—124
3,332,632  7/1967 Johnston _____ 247—7

CHARLES W. LANHAM, *Primary Examiner.*

L. A. LARSON, *Assistant Examiner.*